UNITED STATES PATENT OFFICE.

NATHANIEL C. FOWLER, JR., OF BOSTON, MASSACHUSETTS; FANNIE A. FOWLER ADMINISTRATRIX OF SAID NATHANIEL C. FOWLER, JR., DECEASED.

FRUITED FLOUR AND PROCESS OF MAKING SAME.

1,333,967. Specification of Letters Patent. Patented Mar. 16, 1920.

No Drawing. Application filed August 8, 1916, Serial No. 113,764. Renewed August 17, 1919. Serial No. 318,423.

*To all whom it may concern:*

Be it known that I, NATHANIEL C. FOWLER, Jr., a citizen of the United States, residing at Boston, in the county of Suffolk and State of Massachusetts, have invented new and useful Improvements in Fruited Flour and Processes of Making Same, of which the following is a specification.

This invention relates to improvements in flour and in methods of preparing the same. More particularly it relates to fruited flour of the type disclosed in my United States Letters Patent No. 1,182,264. It is an object of the invention to provide an improvement in the method of manufacture, and also in the product, of flour in which there is a considerable fruit component, arranged in such finely divided form that the product as a whole has the characteristics of flour in its availability for baking bread and has the characteristics of fruit as regards taste, food value, physiological effects, etc. One particular in which the process of manufacture herein set forth differs from that disclosed in my said Letters Patent is that it provides a method by which less heat and less time are required for drying the mixture. The ultimate object being to eliminate moisture, this improvement is effected by first adding water, as a preliminary to the drying, after which the entire body can be dried more rapidly than if the water had not been added.

For a clearer understanding of the invention I give an illustration of the use of the process with wheat flour and raisins as the principal ingredient materials. The seeds may if desired be removed from the raisins, which it will be noted are already a derivative product, resulting after a certain degree, of drying of the original fruit. Then the raisins are cut fine by machine, for which mechanism of the type of the ordinary domestic meat chopper serves, having a tubular passage within which a screw conveyer carries the contents against a perforated plate through which the finely cut product issues. Cereal flour may be mixed with it in the machine if desired as this facilitates the cutting of some kinds of fruits. From this the cut raisins drop into hot water. The water is sufficient in quantity to make a semi-liquid paste. To this is added ordinary white wheat flour, or such other flour as it may be desired to use, and the two are thoroughly mixed. The added flour absorbs the water and makes the whole mass rather dry. The quantity of flour may, for example, be about equal to the quantity of raisins. A mixture in about this proportion, or whatever proportion is chosen, when finished, constitutes a "base" which may afterward be blended with other material as desired for marketing, or for use. This mixture is put again through the comminuting mechanism. As it issues in worm like rods from the perforated discharge plate thereof, it may be dusted with previously completed fruit flour of the same variety and component proportions. Plain cereal flour might be used, but the fruited flour makes no change of the proportions or thoroughness of the general intermixture. The dust, which may be thrown by a blower or by hand, prevents the individual rods of material from sticking together as they fall. The mass is then broken into smaller pieces by passing it through a machine such as a picker, or coarse grinder. Following this comes the drying process, which may be executed in an oven, or preferably by using a vacuum drier or a dry room.

After this the dried product may be milled and bolted like flour. The residue which is too coarse to pass through the bolting screen may be ground with some later batch of material, so that all is used. I have found by experience that the material attains the desired dryness more rapidly and with employment of less heat when water is added to the moisture already in it, at the beginning, as above described, than when the raisins are treated in their natural state. Without knowing with certainty the reason, I believe it to be that the added water dissolves and extracts more or less of the fruit sugar that is within the raisin material and thus facilitates a disintegration of the mass, or at any rate puts it into such condition that disintegration of the cellular structure by the comminuting operation is more thorough. At the same time, such of the jelly like material as remains within the cellular structure becomes fluid and thus more easily passes out. Also the cereal flour is the better able to absorb or draw the moisture from within the raisin structure because of the sugar being in solution. By thus withdrawing a portion of the sugar by means of added water, and then causing the cereal flour to absorb the moisture, including the added water, which because of its fluidity spreads well through the mass, considerably greater effective evaporating surface is provided, with the result that the evaporation proceeds more quickly. The flour acting like a blotter draws moisture and with it sugar from the raisin material and holds it in such shape that the moisture is more quickly given off therefrom during the evaporating process than if the moisture had to be extracted from a stiffer jelly-form in the cellular structure of the raisin material. At the same time the removal of the sugar leaves the cellular structure in such shape that the remainder of the moisture can be dried more quickly and also promotes the breaking down of the cellular structure as a preliminary to the extraction of moisture. The effect of the whole is to reduce time and labor and wear of machinery, and to increase the output of a plant of given size involved in the process. The water also has a definite effect in enabling the comminution to be carried out with less expenditure of power. For this purpose it may be introduced earlier than as above specified, if desired, the advantage gained by this varying with different fruits. Another effect of the water is to make the distribution of the fruit component more uniform throughout the cereal flour. It is contemplated that the drying will be carried out so that the flour of the completed product has the moisture content of ordinary flour, which varies according to the humidity of the atmosphere, but may be in the vicinity of 10% to 12% when so prepared. So far as my experiments have gone the product keeps as well as ordinary flour. It may however be made to keep better than ordinary flour by subjecting it to a pasteurization treament, as by raising it to a temperature of 140° F., for two hours or so, to kill all insect life of the raisin and all pathogenic germ life.

The base product thus described, having about half fruit and half flour, will ordinarily require admixture of additional flour in order to make a final product having the desired properties. For example, a mixture having cereal flour and raisins in the proportion of 4 or 5 to 1 is satisfactory for many purposes. This final mixture can be made by simple addition of sufficient cereal flour to the base to make particular proportions desired. This may be done before the product is marketed, or the base product itself may be packed as a commercial product, leaving it for the user to add to the base more of the same kind of cereal flour or such other flour as he or she may wish in order to get the completed fruit flour which has both the characteristics of flour and of fruit.

The term "flour" as herein used is not limited to the ordinary white wheat flour, nor to any single variety of flour used alone as distinguished from the use of a combination of several kinds of flour. The process and ingredients particularly above described being illustrative, the patent is not to be considered as limited to those specific ingredients or manner of performing.

The particular fruit used as an illustrative example, raisins, happens to be one that has already undergone a drying process. For an illustration of a fruit not so dried, peaches may be taken. In case of such a fruit, not previously dried, it is desirable to desiccate the fruit by some suitable process, as by slicing and then exposing in a vacuum to promote evaporation, or by otherwise drying, after which the fruit may be treated as hereinbefore described.

It is intended that the patent, by suitable expression in the appended claims, shall cover whatever features of patentable novelty exist in the invention herein disclosed.

I claim as my invention:

1. A process of making a fruited flour, including the comminution of dried fruit, the addition of water thereto, mixture therewith of ground cereal, and the subsequent drying of the whole.

2. A process of making a fruited flour, including the comminution of dried fruit, the treatment of the same with hot water, the mixture of ground cereal therewith, and the subsequent drying of the whole.

3. A process of making a fruited flour, including the comminution of dried fruit, the removal of contents of its cellular structure by solution, the absorption of the solution by ground cereal, and the drying of the whole.

4. A process of making a fruited flour, including the comminution of dried fruit, the treatment of the comminuted fruit with water, the addition of cereal flour, and the subsequent drying of the mixture followed by the milling thereof.

5. A process of making a fruited flour, including the comminution of dried fruit, the treatment of the comminuted fruit with water, the addition of cereal flour, the further comminution of the mixture, the dusting of the material thus comminuted with flour as it falls from the comminuting machine, and its subsequent drying, milling and bolting.

6. A process of making a fruited flour, including the comminution of dried fruit, the treatment of the comminuted fruit with water, the addition of cereal flour, the breaking up of the mixture into small masses, and the subsequent drying of the mixture followed by the milling thereof.

7. A food product in the form of flour, including comminuted desiccated fruit and ground cereal, soluble contents of the cellular structure of the fruit having been removed therefrom and deposited on the ground cereal component of the mixture.

Signed by me at Provincetown, Mass., this fourth day of August, 1916.

NATHANIEL C. FOWLER, Jr.

Witnesses:
WILLIAM S. BIRGE,
ETHEL P. HUNTING.